United States Patent
Hoitz et al.

(12)

(10) Patent No.: US 6,176,364 B1
(45) Date of Patent: Jan. 23, 2001

(54) DEVICE FOR SIMPLIFIED VERTICAL LOADING OF AN X-RAY CASSETTE INTO A TRANSPORT RECEPTACLE OF A PROCESSING APPARATUS FOR X-RAY CASSETTES

(75) Inventors: Gerd Hoitz, Bad Ditzenbach; Ulrich Kowatsch, Leonberg; Friedrich Ueffinger, Schorndorf-Weiler, all of (DE)

(73) Assignee: Eastman Kodak Company, Rochester, NY (US)

( * ) Notice: Under 35 U.S.C. 154(b), the term of this patent shall be extended for 0 days.

(21) Appl. No.: 09/166,383

(22) Filed: Oct. 5, 1998

(30) Foreign Application Priority Data

Oct. 11, 1997 (DE) .............................. 197 45 011

(51) Int. Cl.⁷ .................................................. B65G 37/00
(52) U.S. Cl. ..................... 198/346.2; 198/345.1; 198/809
(58) Field of Search ................ 198/346.2, 817, 198/809, 345.1; 378/181, 195, 208

(56) References Cited

U.S. PATENT DOCUMENTS

| 3,072,095 | * | 1/1963 | Keesen et al. ............... 198/346.2 |
| 4,273,234 | * | 6/1981 | Bourgeois ...................... 198/809 |
| 4,311,427 | * | 1/1982 | Coad et al. .................. 198/346.2 |
| 4,743,758 |   | 5/1988 | Chan et al. . |
| 4,962,841 | * | 10/1990 | Kloosterhouse ................ 198/809 |
| 5,105,079 |   | 4/1992 | Boutet et al. . |
| 5,107,116 |   | 4/1992 | Boutet . |
| 5,151,592 |   | 9/1992 | Boutet et al. . |
| 5,278,410 | * | 1/1994 | Boutet et al. ................. 250/589 |
| 5,328,019 | * | 7/1994 | Boutet et al. ............... 198/465.3 |
| 5,330,309 |   | 7/1994 | Brahm et al. . |
| 5,368,643 | * | 11/1994 | Kuster ........................ 198/345.1 |
| 5,493,128 |   | 2/1996 | Boutet . |
| 5,819,904 | * | 10/1998 | Tominaga et al. ............. 198/346.2 |
| 6,082,526 | * | 7/2000 | Baker et al. ................ 198/626.1 |

* cited by examiner

Primary Examiner—Douglas Hess
(74) Attorney, Agent, or Firm—Milton S. Sales

(57) ABSTRACT

A device allows easy, rapid, and reliable loading of X-ray cassettes of different formats into a transport receptacle of a processing apparatus for X-ray cassettes in a space-saving and user-friendly fashion. This is achieved, according to the invention, by the fact that a plurality of guide elements for the conveying means configured as a cassette loading device are provided, which are arranged in a stationary fashion between the transport mechanism spaced apart perpendicular to the cassette transport direction. The guide elements can be conveyed by a drive into and out of a horizontal plane formed by the transport mechanism in such a way that during a conveying movement of the transport mechanism, an X-ray cassette is supported on the transport mechanism in a vertical position and is arrested only by the transport receptacles.

8 Claims, 4 Drawing Sheets

DEVICE FOR SIMPLIFIED VERTICAL LOADING OF AN X-RAY CASSETTE INTO A TRANSPORT RECEPTACLE OF A PROCESSING APPARATUS FOR X-RAY CASSETTES

FIELD OF THE INVENTION

The invention relates to a device for simplified vertical loading of an X-ray cassette into a transport receptacle of a processing apparatus for X-ray cassettes.

BACKGROUND OF THE INVENTION

U.S. Pat. No. 5,493,128 discloses a receiving unit for X-ray cassettes in a cassette handling apparatus, the unit being suitable for the transport of vertically positioned cassettes of different formats. The device substantially has a part, configured as a separating mechanism, with a number of slots into which the cassettes are loaded. By means of a part which can be lifted and lowered vertically and moved horizontally forward in steps, and which has a number of slots that corresponds to the number of slots in the separating mechanism, the cassettes are transported to a transfer mechanism which transfers them into a reading and erasing unit.

Because the width of the loading slot only slightly exceeds the thickness of an X-ray cassette, precise vertical loading of X-ray cassettes into the slot is usually associated with a laborious threading-in process, which becomes the more difficult, the larger the X-ray cassette formats that are selected. This transport device is, moreover, of complex physical construction and, because of the large number of moving parts whose movements must be precisely adjusted to one another, is also susceptible to malfunctions.

SUMMARY OF THE INVENTION

It is the object of the invention to create a device which is of simple physical construction and allows easy, rapid, and reliable vertical loading of X-ray cassettes of different formats into a transport receptacle of a processing apparatus for X-ray cassettes in a space-saving and user-friendly fashion.

According to a feature of the present invention, a device for simplified vertical loading of an X-ray cassette into a transport receptacle of a processing apparatus for X-ray cassettes includes a first and a second conveyor configured as a cassette loading and unloading device. The conveyors have a plurality of transport devices arranged in a horizontal plane and spaced apart from one another in a transport direction and also perpendicular thereto. Transport receptacles are associated with the conveyors, said transport receptacles being arranged on an endless transport belt configured as a cassette receiving device. A plurality of guide elements are provided for the conveyors configured as a cassette loading device, the guide elements being arranged in a stationary fashion between the transport devices spaced apart perpendicular to the cassette transport direction, wherein the guide elements can be conveyed by a drive into and out of the horizontal plane in such a way that during a conveying movement of the transport devices in the transport direction, the X-ray cassette is supported on the transport devices in a vertical position and is arrested only by the transport receptacles.

The device according to a preferred embodiment of the invention has a plurality of guide elements for conveying means configured as a cassette loading device, the guide elements being arranged in a stationary fashion between transport means spaced apart perpendicular to the cassette transport direction. The guide elements can be conveyed by a drive into and out of a horizontal plane formed by the transport means in such a way that during a conveying movement of the transport means, an X-ray cassette is supported on the transport means in a vertical position and is arrested only by transport receptacles. The guide elements are formed by centering members, each arranged spaced apart on a shaft, which are rotatable through at least an angular range of 180 degrees by means of the shafts which are joined by connecting rods to a motor. Particularly rapid positioning into the receptacles, brought about automatically by the weight of the X-ray cassettes, is made possible by the fact that two truncated cone segments assembled at their base surfaces constitute each centering member, the circumferential surfaces of which, together with those of a respective adjacent centering member, form a funnel-shaped receptacle for loading of an X-ray cassette. This process is aided, in particular, by the fact that the X-ray cassettes have only point contact against the circumferential surfaces, and that the receptacle has an angle of 90 to 120 degrees. An X-ray cassette positioned in this fashion can be securely and rapidly arrested by insertion into the transport receptacles which are formed by truncated pyramids spaced apart from one another.

The particular advantageous result of a device of this kind is that X-ray cassettes of different formats can be deposited, in a space-saving manner, rapidly and reliably onto the conveying means configured as a cassette loading device.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
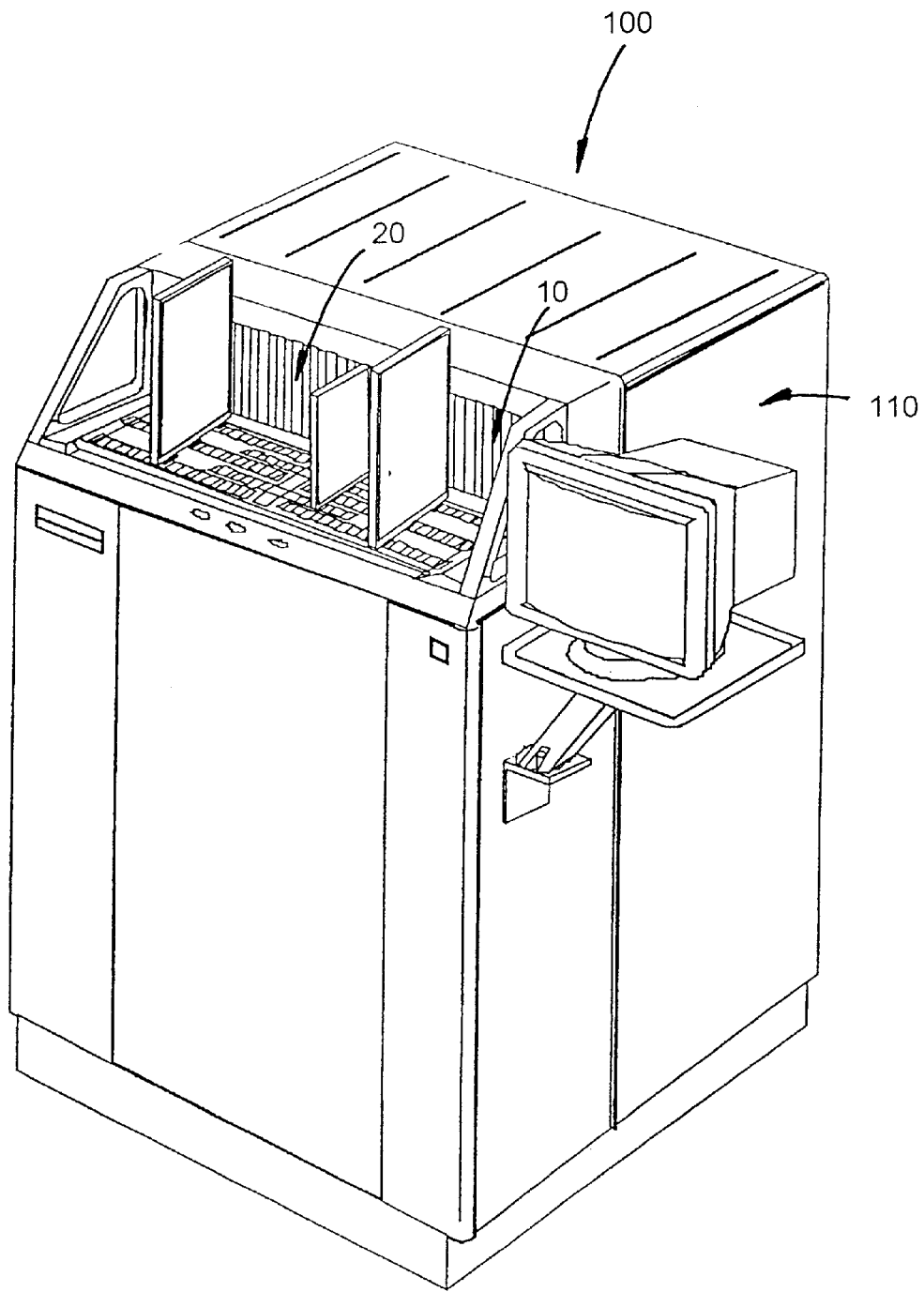
FIG. 1 shows a known processing apparatus for X-ray cassettes, with conveying means configured as a cassette loading and unloading device.

The transport device according to the invention is utilized in a processing apparatus 100 for X-ray cassettes, an autoloader known per se and depicted in FIG. 1. Reference is made in particular to a corresponding patent application of the applicant, entitled "Transport device for X-ray cassettes, each having a phosphor sheet stimulable by X-rays, in a cassette processing apparatus" in which the aforesaid autoloader and the transport sequence for the X-ray cassettes are sufficiently described. The autoloader substantially comprises two conveying means 10 and 20 configured as cassette loading and unloading devices, an electronic control unit (not depicted), a reading unit (scanner) and erasing unit for the phosphor sheet (not depicted) in housing part 110, and further transport means for transporting and handling the X-ray cassettes between the aforesaid apparatuses. The reading unit and the scanner have already been described in detail in one of U.S. Pat. Nos. 4,743,758; 5,105,079; 5,107,116; and 5,151,592, so that additional explanation may be dispensed with. The transport means for transporting the X-ray cassettes between the reading and erasing units are also sufficiently disclosed in U.S. Pat. No. 5,330,309 and in U.S. Pat. No. 5,493,128. X-ray cassettes 1 of different formats, but preferably of the formats 18×24 cm, 24×30 cm, 35×43 cm, and 35×35 cm, with the same X-ray cassette thickness in each case, are in particular transportable.

Figure 2:
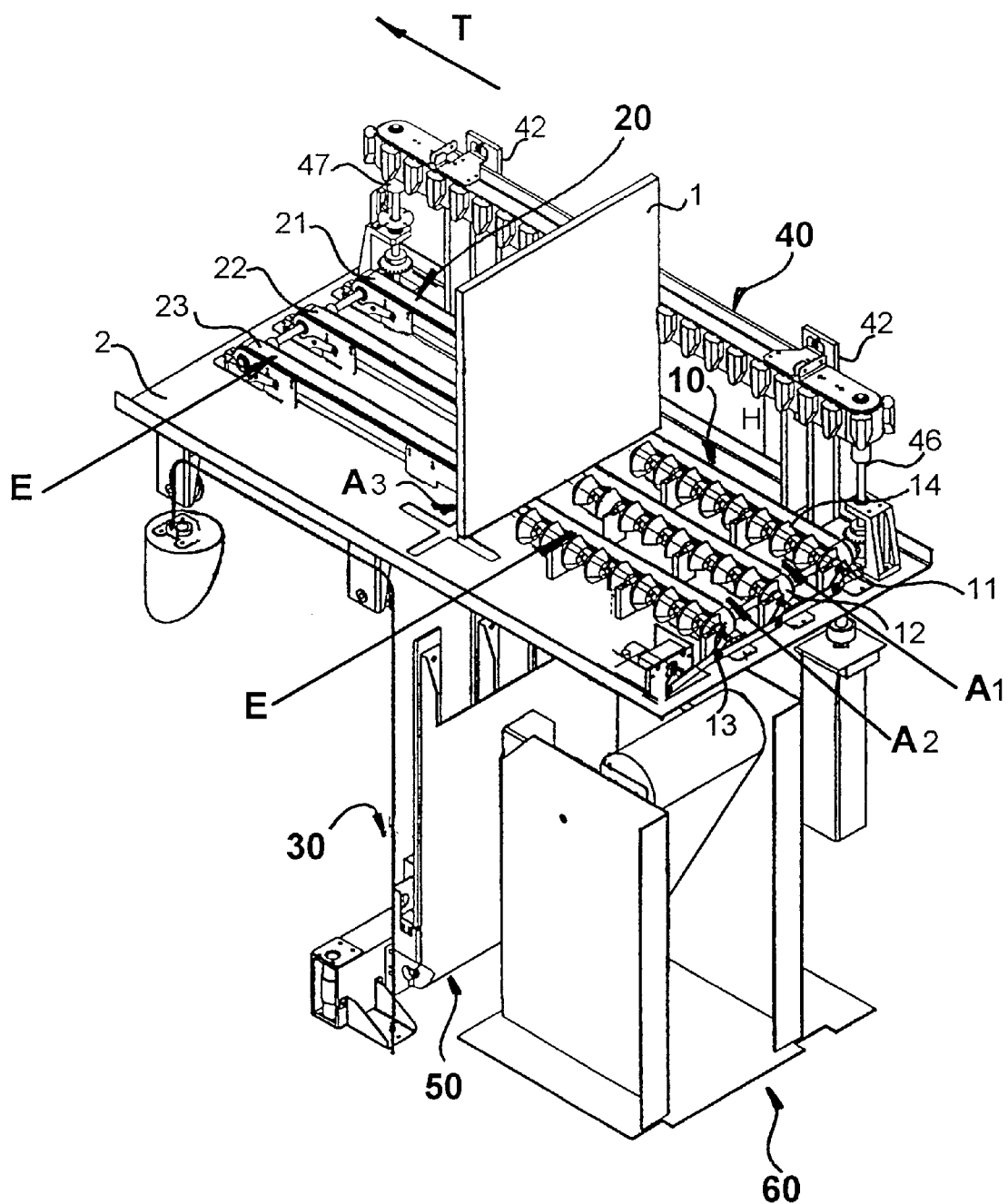
FIG. 2 is a perspective view of the device according to the invention, with guide elements and the transport means for the X-ray cassettes.
Figure 3:
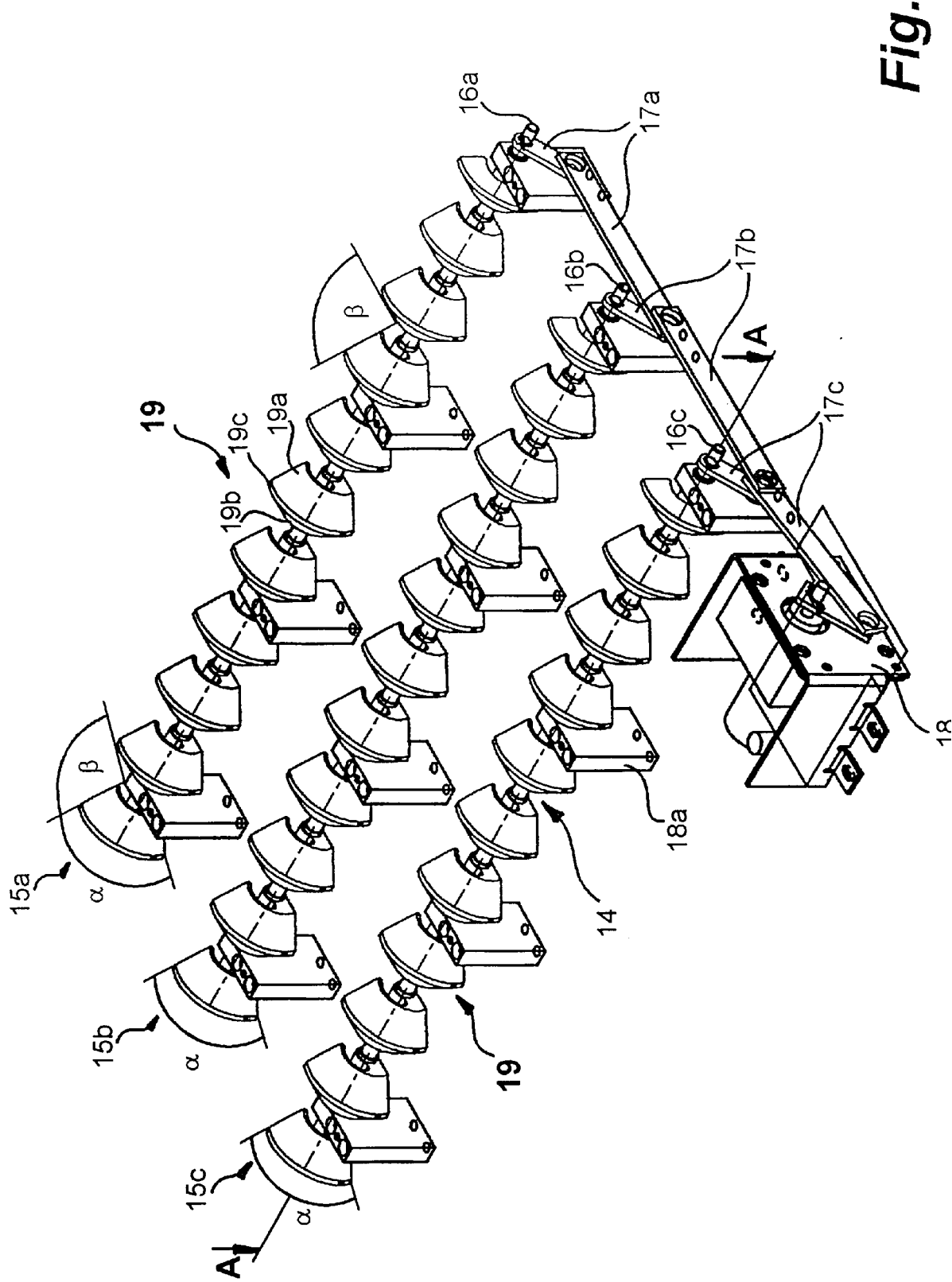
FIG. 3 is a perspective detailed view of the guide elements.
Figure 4:
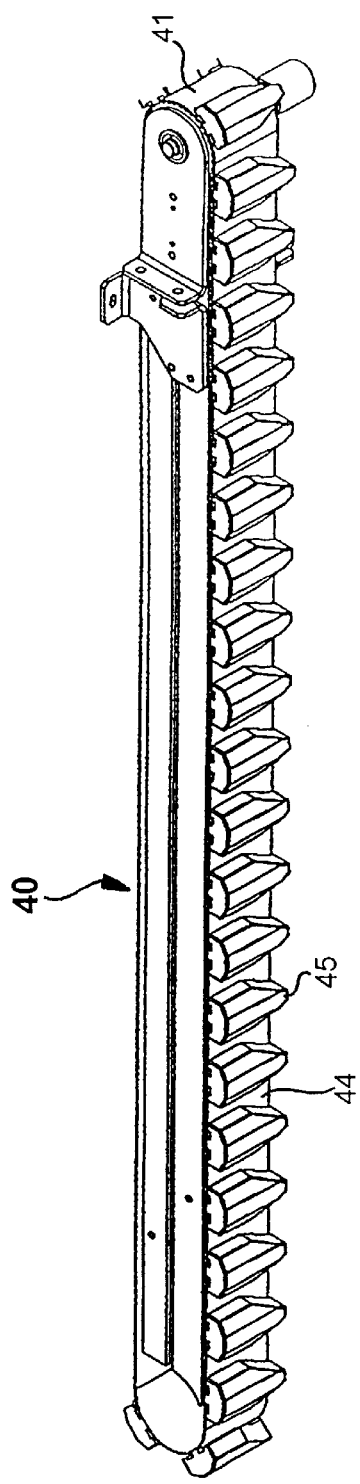
FIG. 4 is a perspective view of the cassette receiving means.

As depicted in FIG. 2, conveying means 10 and 20 arranged on a carrier plate 2 have at least three endless transport belts 11 to 13 and 21 to 23, which lie horizontally in a plane E and which are separated by a spacing A3 in the transport direction T of the X-ray cassettes, and also by spacings A1 and A2 perpendicular thereto. Spacing A3 is selected such that it slightly exceeds the thickness of an X-ray cassette. A further cassette holding element 40, configured as an endless transport belt 41, runs parallel to the rear longitudinal edge of transport belts 11 and 21 in a vertical plane. By means of support elements 42, transport belt 41 is arranged at a height H from horizontally extending transport belts 11 and 21 such that an X-ray cassette of even the smallest format can still be reliably seized and transported by transport belt 41. The drive shafts of the transport belts of conveying means 10 and 20 are driven by a stepping motor via a toothed belt (not depicted), as are also the front and rear drive shafts 46 and 47 of transport belt 41 via bevel gears. In a further embodiment of the invention, the aforesaid transport belts can also be driven by respective separate stepping motors which are then operated by the electronic control unit. In both embodiments, however, all transport belts 11 to 13, 21 to 23, and 41 are each driven synchronously, so that no slippage occurs between the individual transport belts.

For vertical mounting of X-ray cassette 1 during transport on transport belts 11 to 13, transport belt 41 has receptacles 44 which are formed by truncated pyramids 45 spaced apart from one another. The pyramids are additionally beveled in the direction toward the transport belts so as to facilitate loading of an X-ray cassette into receptacle 44.

Figure 5:
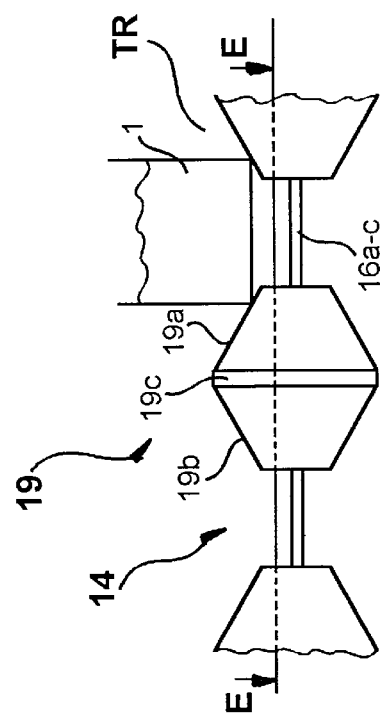
FIG. 5 is a sectional view along line A—A as shown in FIG. 3.

Arranged between transport belts 11 to 13 of the cassette loading device are identically configured guide elements 15a, 15b, and 15c which are formed by centering members 19 arranged, spaced apart from one another, each on a shaft 16a, 16b, and 16c. All three shafts 16a to 16c are connected by means of connecting rods 17a to 17c to a motor 18 in such a way that one 360-degree motor revolution causes the shafts with the centering members to rotate through at least an angular range of 180 degrees. The Motor 18 is controlled by activation or deactivation of motor voltage by the control unit (not depicted). The shafts are mounted, by means of bearing members 18a, slightly below plane E formed by transport belts 11 to 13, which represents the support surfaces for the X-ray cassettes (FIG. 5).

Figure 6:
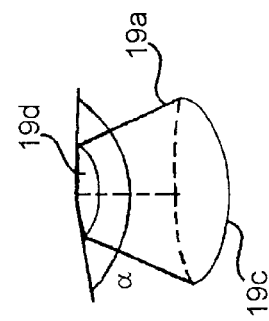
FIG. 6 is a perspective view of a centering member.

Each centering member 19 comprises a truncated cone segment 19a and 19b which a rejoined at their base surfaces 19c. The truncated cone segments have a segment angle a of approximately 120 to 150 degrees (FIG. 6). The circumferential surfaces of the truncated cone segments form, with those of a respective adjacent truncated cone segment, a funnel-shaped receptacle 14 with an angle β of approximately 90 to 120 degrees. An X-ray cassette 1 can then be loaded, as depicted in FIG. 5. With transport belts 11 to 13 in the operating state, the truncated cone segments are pivoted completely out of plane E, i.e. the end surfaces 19d of the truncated cones are located below plane E.

As is further evident from FIG. 2, an X-ray cassette 1 can be transferred by a conveying mechanism 30 into a cassette receiving device 50 coupled to a pivoting table 60. By means of the table, the X-ray cassette, comprising a phosphor-coated foil, can be delivered to a reading unit by which the X-ray image stored on the foil can be read. Express reference is made once again to the applicant's corresponding patent application entitled "Transport device for X-ray cassettes, each having a phosphor sheet stimulable by X-rays, in a cassette processing apparatus" in which the transport sequence for an X-ray cassette is described in detail.

An optoelectronic sensor (not depicted; see corresponding patent application) mounted in A3 on the cassette holding element 40 determines on the one hand whether an X-ray cassette is located in a position for transfer from conveying means 10 into conveying mechanism 30, and whether it has been properly conveyed into receiving device 50. Sensor 5 is formed by IR transmission and reception elements known per se, which are controlled by means of the electronic control unit (not depicted).

With cassette processing apparatus 100 in its initial state, conveying mechanism 30 which is not loaded with an X-ray cassette 1, and guide elements 15a to 15c, are located in plane E, as depicted in FIG. 2. X-ray cassettes 1 with the aforesaid different formats can now be loaded into conveying means 10 configured as the cassette loading device, in any order and in vertical alignment, into receptacles 14 of guide elements 15a to 15c. The X-ray cassettes are centered as a result of the funnel-shaped configuration of the receptacles, so that they can now, aligned approximately vertically, be easily loaded into receptacle 44. Up to fifteen X-ray cassettes can be delivered to the cassette loading device in accordance with the preferred length of the transport belts. After actuation of the start button on the electronic control unit (not depicted), the optoelectronic sensor 5 determines whether an X-ray cassette 1 is in a position for transfer to conveying mechanism 30. If not, stepping motors (not depicted) advance transport belts 11 to 13, 21 to 23, and 41 into that position. If so, a further advancing movement aligns X-ray cassette 1 in the center of conveying mechanism 30 and thus also exactly in A3. The stepping motors for the transport belts thereafter remain shut down. Simultaneously with actuation of the start button, motor 18 for guide elements 15a to 15c is activated, so that shafts 16a to 16c are rotated 180 degrees by means of connecting rods 17a to 17c. Motor 18 is then shut down. Centering members 19 are thus also rotated out of plane E, whereby the X-ray cassettes are lowered onto transport belts 11 to 13 and are now retained only by receptacles 44. After the advance of all the transport belts has been terminated by shutting down the aforesaid stepping motors, motor 18 is once again activated by means of the control unit, so that centering members 19 are rotated back into plane E for another loading of an X-ray cassette, as depicted in FIG. 5. Execution of this operation repeats until all receptacles 14/44 are loaded and an X-ray cassette is in a position for transfer to conveying mechanism 30. As X-ray cassette processing continues, conveying mechanism 30 is lowered out of plane E, and the X-ray cassette is loaded into receiving device 50 and pivoted by means of pivoting table 60 into a horizontal transport position for transfer into the reading unit; the sequence is then performed in the reverse order until the X-ray cassettes have been set down on transport belts 21 to 23 configured as the cassette unloading device.

The invention has been described in detail with particular reference to preferred embodiments thereof, but it will be understood that variations and modifications can be effected within the spirit and scope of the invention.

| Parts List | |
|---|---|
| 1 | X-ray cassette |
| 2 | Carrier plate |
| 10 | Cassette loading device |
| 11 | Transport belt |
| 12 | Transport belt |
| 13 | Transport belt |
| 14 | Funnel-shaped receptacle formed by respective adjacent centering members 19 |
| 15a-15c | Guide elements |
| 16a-16c | Shafts |
| 17a-17c | Connecting rods |
| 18 | Motor |
| 19 | Centering member |
| 19a | Truncated cone segment |
| 19b | Truncated cone segment |
| 19c | Base surface of truncated cone |
| 20 | Cassette unloading device |
| 21 | Transport belt |
| 22 | Transport belt |
| 23 | Transport belt |
| 26 | Drive shaft |
| 30 | Conveying means |
| 40 | Cassette holding element |
| 41 | Transport belt |
| 42 | Support elements |
| 44 | Receptacles |
| 45 | Truncated pyramid |
| 46 | Front drive shaft |
| 47 | Rear drive shaff |
| 50 | Cassette receiving device |
| 60 | Pivoting table |
| A1 | Spacing between transport belt 11 and 12, and 21 and 22 |
| A2 | Spacing between transport belt 12 and 13, and 22 and 23 |
| A3 | Spacing between transport belt 11–13 and transport belts 21–23 |
| T | Transport direction of X-ray cassettes |
| H | Height |
| E | Plane of transport belts 11–33 |
| α | Segment angle of truncated cone |
| β | Angle of receptacle 14 |
| 100 | Cassette processing unit |
| 110 | Housing part |

What is claimed is:

1. A device for simplified vertical loading of an X-ray cassette into a transport receptacle of a processing apparatus for X-ray cassettes, said device comprising first and second conveyors configured as a cassette loading and unloading device, said conveyors having a plurality of transport devices arranged in a horizontal plane and spaced apart from one another in a transport direction and also perpendicular thereto, transport receptacles associated with said conveyors, said transport receptacles being arranged on an endless transport belt configured as a cassette receiving device;

a plurality of guide elements provided for the conveyors configured as a cassette loading device, said guide elements being arranged in a stationary fashion between the transport devices spaced apart perpendicular to the cassette transport direction, wherein the guide elements can be conveyed by a drive into and out of the horizontal plane in such a way that during a conveying movement of the transport devices in the transport direction, the X-ray cassette is supported on the transport devices in a vertical position and is arrested only by the transport receptacles.

2. A device as defined in claim 1, wherein the guide elements are formed by centering members, each arranged spaced apart on a shaft, which are rotatable through at least an angular range of 180 degrees by means of the shafts which are joined by connecting rods to a motor.

3. A device as defined in claim 2, wherein two truncated cone segments assembled at their base surfaces form a centering member having circumferential surfaces which together with those of a respective adjacent centering member, form a funnel-shaped receptacle for loading of an X-ray cassette.

4. A device as defined in claim 3, characterized in that the receptacle has an angle ($\beta$) of 90 to 120 degrees.

5. A device as defined in claim 3, wherein the truncated cone segments have a segment angle ($\alpha$) of 120 to 150 degrees such that the guide elements brought by the motor into the horizontal plane cause the X-ray cassette to be supported against the circumferential surfaces of the centering members.

6. A device as defined in claim 3, wherein the transport receptacles and the funnel-shaped receptacles are arranged centeredly with respect to one another.

7. A device as defined in claim 1, wherein the transport receptacles are formed by truncated pyramids spaced apart from one another.

8. A device as defined in claim 1, wherein a transport belt arranged in a plane vertical to the transport devices constitutes the rear delimitation of the conveyor.

\* \* \* \* \*